(12) United States Patent
Ries et al.

(10) Patent No.: US 8,094,071 B2
(45) Date of Patent: Jan. 10, 2012

(54) METHOD OF RECEPTION AND RECEIVER FOR A RADIO NAVIGATION SIGNAL MODULATED BY A CBOC SPREAD WAVE FORM

(75) Inventors: Lionel Ries, Toulouse (FR); Jean-Luc Issler, Toulouse (FR); Olivier Julien, Toulouse (FR); Christophe Macabiau, Montaubau (FR)

(73) Assignee: Centre National d'Etudes Spatiales (FR)

( * ) Notice: Subject to any disclaimer, the term of this patent is extended or adjusted under 35 U.S.C. 154(b) by 280 days.

(21) Appl. No.: 12/306,155

(22) PCT Filed: Jun. 18, 2007

(86) PCT No.: PCT/EP2007/056030
§ 371 (c)(1),
(2), (4) Date: Feb. 20, 2009

(87) PCT Pub. No.: WO2007/147807
PCT Pub. Date: Dec. 27, 2007

(65) Prior Publication Data
US 2009/0289847 A1    Nov. 26, 2009

(30) Foreign Application Priority Data

Jun. 21, 2006 (FR) .................................. 06 05551
Aug. 17, 2006 (FR) .................................. 06 53386

(51) Int. Cl.
*G01S 19/29* (2010.01)
*G01S 19/30* (2010.01)
*H04B 1/69* (2011.01)

(52) U.S. Cl. ............... 342/357.68; 342/357.69; 375/150

(58) Field of Classification Search ............ 342/357.63, 342/357.67–357.69, 357.71–357.73; 375/140–143, 375/145–150, 152, E1.005, E1.006; *G01S 19/24, G01S 19/29, 19/30, 19/32; H04B 1/69, 1/709*
See application file for complete search history.

(56) References Cited

U.S. PATENT DOCUMENTS 6,922,167 B2 * 7/2005 Gerein .................... 342/357.74
(Continued)

FOREIGN PATENT DOCUMENTS

WO    WO 2006027004 A1 *    3/2006

OTHER PUBLICATIONS

Hein G W et al: "MBOC: The New Optimized Spreading Modulation Recommended for GALILEO L1 OS and GPS L1C" Position, Location, and Navigation Symposium, 2006 IEEE/ION Coronado, CA Apr. 25-27, 2006, Piscataway, NJ, USA, IEEE, Apr. 25, 2006, pp. 883-892, XP010925014; ISBN: 0-7803-9454-2 cited in the application Paragraphe "CBOC Implementation", p. 887.
International Search Report; PCT/EP2007/056030; Sep. 28, 2007.
Avila-Rodriguez et al: "CBOC? An Implementation of MBOC", First CNES Workshop on Galieo Signals and Signal Processing, pp. 12-13, Oct. 12, 2006, XP002420830.

*Primary Examiner* — Thomas Tarcza
*Assistant Examiner* — John Vigushin
(74) *Attorney, Agent, or Firm* — Cantor Colburn LLP

(57) ABSTRACT

Disclosed is a method for receiving a radionavigation signal modulated by a composite waveform, the composite waveform comprising a linear combination with real-valued coefficients of a BOC($n_1$,m) component and a BOC($n_2$,m) component, $n_1$ differing from $n_2$; in which a correlation is performed between a local waveform and the composite waveform over a time interval of duration T, wherein the local waveform is a binary waveform, formed over the time interval by an alternating succession comprising at least one BOC($n_1$,m) waveform segment and at least one BOC($n_2$,m) waveform segment, the at least one BOC($n_1$,m) segment having a total duration of $\alpha$T, $\alpha$ being strictly between 0 and 1, the at least one BOC($n_2$,m) segment having a total duration of $(1-\alpha)$T.

11 Claims, 5 Drawing Sheets

U.S. PATENT DOCUMENTS 7,860,151 B2 * 12/2010 Djuknic et al. ............... 375/146
2008/0260001 A1 * 10/2008 Betz et al. .................... 375/140
2008/0262726 A1 * 10/2008 Hoult ........................... 701/213

* cited by examiner

METHOD OF RECEPTION AND RECEIVER FOR A RADIO NAVIGATION SIGNAL MODULATED BY A CBOC SPREAD WAVE FORM

TECHNICAL FIELD OF THE INVENTION

The present invention relates to a method of receiving and a receiver for a radionavigation signal modulated by a CBOC spreading waveform.

BRIEF SUMMARY OF RELATED ART

Satellite positioning systems such as GPS (Global Positioning System), Galileo, GLONASS, QZSS and others make use of "spread-spectrum" modulated navigation signals. These signals essentially carry pseudo-random codes made up of numerical sequences which repeat periodically, the main function of which is to permit Code Distribution Multiple Access (CDMA) and the provision of an accurate measurement of the propagation time for the signal transmitted by the satellite. Satellite positioning signals may incidentally also carry useful data.

In the case of GPS, the navigation signals are transmitted in the L1 frequency band, centred on 1575.42 MHz, and the L2 frequency band, centred on 1227.6 MHz. The L5 band, centred on 1176.45 MHz, will be added during the modernisation of GPS. The satellites of the Galileo constellation will transmit in the bands: E2-L1-E1 (the portion of the median band L1 being the same as that for GPS), E5a (which, according to Galileo nomenclature, is the L5 band intended for GPS), E5b (centred on 1207.14 MHz) and E6 (centred on 1278.75 MHz).

The navigation signals are formed by modulating the central (carrier) frequencies. Various modulation schemes have already been established or are at least under consideration for creating navigation signals. In order to ensure interoperability and compatibility between the GPS and Galileo systems, the United States of America and the European Union have agreed upon certain points relating to signal modulation schemes in the L1 band, which is used by both systems. More details about the proposed modulation schemes may be obtained from the publication "MBOC: The New Optimized Spreading Modulation Recommended for GALILEO L1 OS and GPS L1C", Hein et al., InsideGNSS, May/June 2006, pp. 57-65.

One of the modulation schemes selected as a candidate for modulating the Galileo OS L1 signal is known under the name "CBOC modulation" (from "Composite Binary Offset Carrier"). The CBOC spreading waveform modulating the carrier is a linear combination of a first BOC(1,1) waveform and a second BOC(m,1) waveform. BOC is the abbreviation of "Binary Offset Carrier". In general, BOC(n,m) is a function of time t defined by:

$$BOC(n,m)(t) = C_m(t) \cdot \text{sign}[\sin(2\pi f_{sc} t)],$$

where $C_m(t)$ is a pseudo-random code of a chip rate m×1.023 Mcps assuming the values +1 or −1 and $f_{sc}$ is the frequency n×1.023 MHz. One condition applying to n and m is that the ratio 2n/m is integer. In the case of the Galileo Open Service (OS), the chip rate is set to 1.023 Mcps (megachips per second). In this case, a CBOC waveform may be written as:

$$CBOC(n_1,1)(t) = V \cdot BOC(1,1)(t) + W \cdot BOC(n_1,1)(t),$$

where V and W are real coefficients defining the relative weighting of the BOC(1,1) and BOC(m,1) components. In the case of a CBOC waveform, the two BOC components carry the identical pseudo-random code.

A CBOC waveform may be considered to be a particular member of a family of composite waveforms described, for example in European patent application 05 290 083.4. The same document also describes methods for receiving a signal modulated by a composite waveform. According to the first method described, correlation is performed of the incoming signal modulated by a CBOC waveform and a local replica of this CBOC waveform. This solution involves generating a replica CBOC in the receiver. It is therefore necessary to implement four-level quantisation at the correlator input, which requires at least a 2-bit architecture. According to the second method described, correlations are performed respectively between the incoming signal and a local replica of the first BOC component, and between the incoming signal and a local replica of the second BOC component. The results of the two correlations are then combined. In this solution, the local replicas are one-bit, which may be considered advantageous relative to the first solution. The price to be paid is a doubling of the number of correlation operations in comparison with the first solution, all other things being equal.

BRIEF SUMMARY OF THE INVENTION

The invention proposes a novel method for receiving a radionavigation signal modulated by a composite spreading waveform.

In order to receive a radionavigation signal modulated by a composite waveform, said composite waveform comprising a linear combination with real-valued coefficients of a BOC($n_1$, m) component and a BOC($n_2$,m) component, $n_1$ differing from $n_2$, it is proposed to perform a correlation between a local waveform and the composite waveform over a time interval of duration T. According to an important aspect of the invention, the local waveform is a binary waveform, formed over said time interval by an alternating succession comprising at least one BOC($n_1$,m) waveform segment and at least one BOC($n_2$,m) waveform segment, the at least one BOC($n_1$, m) segment having a total duration of αT, α being strictly between 0 and 1, the at least one BOC($n_2$,m) segment having a total duration of (1−α)T. Unlike the receiving methods discussed above, the method according to the invention does not involve a waveform with more than two levels and does not require a larger number of correlators.

In a preferred embodiment of the invention, the BOC($n_1$, m) and BOC($n_2$,m) components carry an identical pseudo-random code and the local waveform carries at least one predetermined part of said pseudo-random code. The pseudo-random codes used in satellite radionavigation are either entirely predetermined codes (in the case of a pilot channel) or codes comprising a predetermined part and a "data" part (in the case of a data channel). The "data" part is transmitted at a symbol rate distinctly lower than the chip rate of the predetermined part.

Where $n_2$=1 and m=1, the linear combination is a CBOC ($n_1$,1) waveform defined by:

$$CBOC(n_1,1) = V \cdot BOC(1,1) + W \cdot BOC(n_1,1),$$

where V and W are real-valued weighting coefficients. With regard to the CBOC candidate for the future Galileo OS L1 signal, it has furthermore been agreed that $n_1$=6. In some cases, it might prove advantageous, for receiving a CBOC($n_1$, 1) signal, for α to be at least approximately equal to the reference value W/(V+W). In other cases, it could be more appropriate for α to be less than or greater than this reference value.

The local waveform may comprise an alternating succession comprising a single BOC($n_1$,m) waveform segment and a single BOC($n_2$,m) waveform segment. In another embodiment of the invention, the alternating succession comprises a plurality of BOC($n_1$,m) waveform segments of a total duration $\alpha T$ and/or a plurality of BOC($n_2$,m) waveform segments of a total duration $(1-\alpha)T$.

In order to implement the method according to the invention, a receiver is proposed which is capable of receiving a radionavigation signal modulated by a composite waveform, the composite waveform comprising a linear combination with real-valued coefficients of a BOC($n_1$,m) component and a BOC($n_2$,m) component, $n_1$ differing from $n_2$, the receiver comprising a set of local waveform generators and correlators to perform correlation between the local waveform and said composite waveform over a time interval of duration T. The local waveform generators are in particular configured to generate a local binary waveform, formed over said time interval of an alternating succession comprising at least one BOC($n_1$,m) waveform segment and at least one BOC($n_2$,m) waveform segment, the at least one BOC($n_1$,m) segment having a total duration of $\alpha T$, $\alpha$ being strictly between 0 and 1, the at least one BOC($n_2$,m) segment having a total duration $(1-\alpha)T$.

According to a preferred embodiment, the receiver comprises a control unit acting on the local waveform generators so as to influence (a) the temporal order of the BOC($n_1$,m) segment(s) and of the BOC($n_2$,m) segment(s) and/or (b) the duration of the BOC($n_1$,m) segment(s) and of the BOC($n_2$,m) segment(s). This embodiment is particularly advantageous for a receiver suited to the future Galileo OS L1 and GPS L1C signals. This is because the modulation intended for the latter signal is a time-multiplexed BOC modulation (TMBOC, Time-Multiplexed BOC) having a BOC(1,1) component and a BOC(6,1) component. If the modulation selected for Galileo OS L1 is a CBOC(6,1) modulation, it will then be possible to receive both signals with the same receiver. By acting on the temporal order of the BOC(1,1) and BOC(6,1) segments and/or on their duration, the control unit can optimise the local waveform for receiving either TMBOC from GPS, or CBOC from Galileo.

BRIEF DESCRIPTION OF THE DRAWINGS

A preferred embodiment of the invention will be described hereafter, by way of non-limiting example, with reference to the appended drawings, in which.

DETAILED DESCRIPTION OF THE INVENTION

Figure 1:
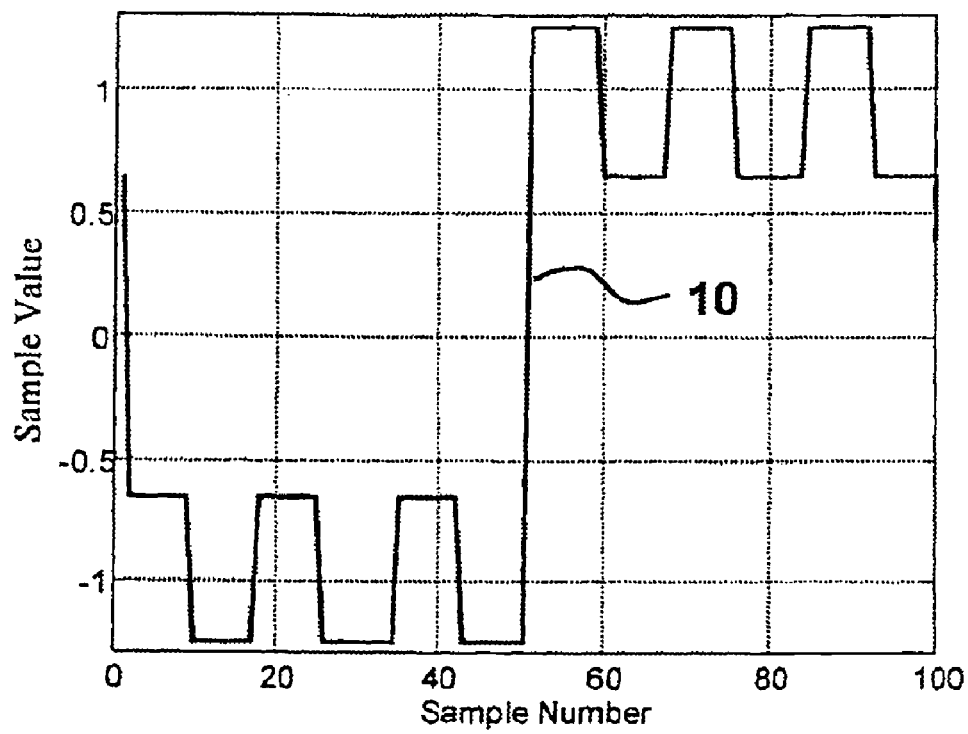
FIG. 1: is a temporal representation of a CBOC(6,1) waveform.

FIG. 1 shows a CBOC(6,1) waveform 10, defined by:

$$CBOC(6,1)(t) = V \cdot BOC(1,1)(t) - W \cdot BOC(6,1)(t)$$

where V and W are the weighting factors. The following notations will be used hereafter:

$$BOC(1,1)(t) = C_P(t) \cdot x(t) \text{ and}$$

$$BOC(6,1)(t) = C_P(t) \cdot y(t),$$

where $C_P(t)$ represents the pseudo-random code common to the two components.

Different values of V and W are considered for the Galileo OS L1 signal, depending on the multiplexing scheme of this signal. Further details can be found in the article by Hein et al. in InsideGNSS, the complete reference of which is stated in the introduction.

In order to introduce certain notations and better explain the advantages of the invention, a method of tracking the CBOC 10 signal, the principle of which has been described in European patent application 05 290 083.4, will be discussed below. In this method, there are two correlations to be performed in parallel: one with a local replica BOC(1,1) and one with a local replica BOC(6,1). The local replicas are as follows $$s_{I1}(t) = C_P(t)x(t)\cos(2\pi f_0 t + \hat{\phi}),$$

$$s_{Q1}(t) = C_P(t)x(t)\sin(2\pi f_0 t + \hat{\phi}),$$

$$s_{I2}(t) = C_P(t)y(t)\cos(2\pi f_0 t + \hat{\phi}),$$

$$s_{Q2}(t) = C_P(t)y(t)\sin(2\pi f_0 t + \hat{\phi}),$$

where the indices I and Q indicate the "in-phase" and "quadrature" components of the local replicas, $f_0$ is the carrier frequency and $\hat{\phi}$ a phase. When the CBOC signal is correlated with $s_{I1}$, the following is obtained:

$$I_1 = \int_0^T s_{I1}(t-\hat{\tau})CBOC(t-\tau)dt,$$

$$I_1 = \int_0^T C_P(t-\hat{\tau})x(t-\hat{\tau})\cos(2\pi f_0 t + \hat{\phi})$$

$$C_P(t-\tau)\{Vx(t-\tau) - Wy(t-\tau)\}\cos(2\pi f_0 t + \phi)dt,$$

$$I_1 = (VR_{BOC(1,1)}(\varepsilon_\tau) - WR_{BOC(1,1)/BOC(6,1)}(\varepsilon_\tau))\cos(\varepsilon_\phi),$$

where $\hat{\tau}$ is the phase of the pseudo-random code of the local replica signal, estimated from the phase $\tau$ of the pseudo-random code of the received signal, $\hat{\phi}$ the phase of the carrier of the local replica signal, estimated from the phase $\phi$ of the phase of the carrier of the received signal, T the duration of the integration interval, $R_{BOC(1,1)}$ the autocorrelation function of a BOC(1,1) waveform, $R_{BOC(1,1)/BOC(6,1)}$ the correlation function between a BOC(1,1) waveform and a BOC(6,1) waveform, $\varepsilon_\tau = \hat{\tau} - \tau$ and $\varepsilon_\phi = \hat{\phi} - \phi$. In the same manner, it is possible to write:

$$Q_1 = (VR_{BOC(1,1)}(\varepsilon_\tau) - WR_{BOC(1,1)/BOC(6,1)}(\varepsilon_\tau))\sin(\varepsilon_\phi),$$

$$I_2 = (VR_{BOC(1,1)/BOC(6,1)}(\varepsilon_\tau) - WR_{BOC(6,1)}(\varepsilon_\tau))\cos(\varepsilon_\phi),$$

$$Q_2 = (VR_{BOC(1,1)/BOC(6,1)}(\varepsilon_\tau) - WR_{BOC(6,1)}(\varepsilon_\tau))\sin(\varepsilon_\phi),$$

where $R_{BOC(6,1)}$ is the autocorrelation of a BOC(6,1) waveform.

Figure 2:
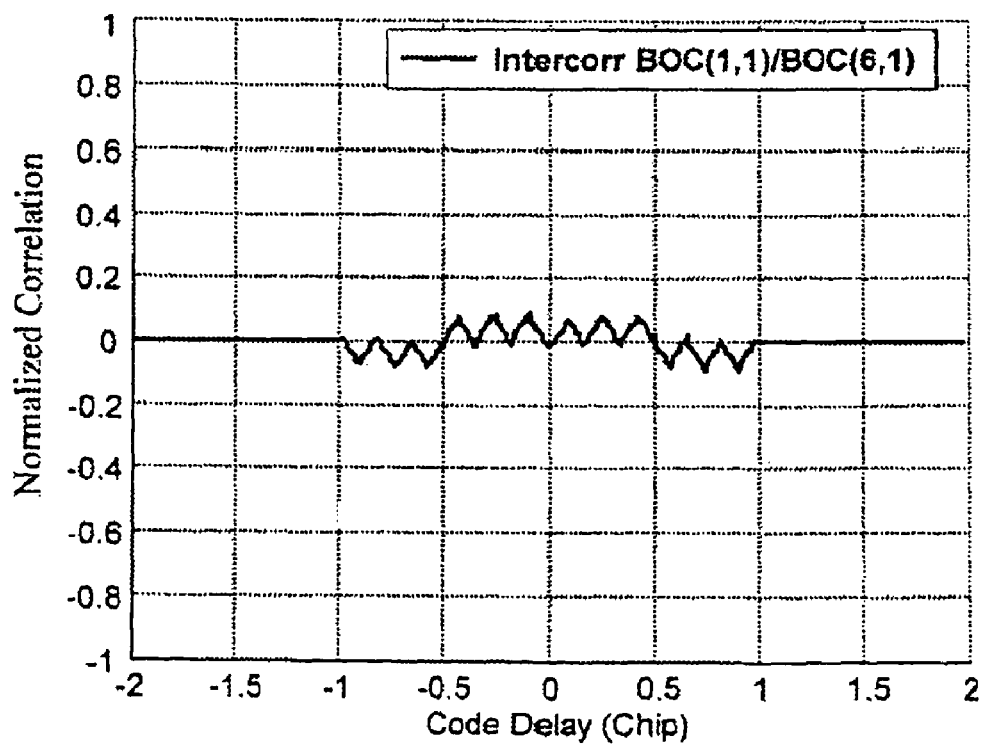
FIG. 2: is a representation of a correlation between a BOC(1,1) waveform and a BOC(6,1) waveform.

By recombining the correlations and exploiting the fact that the correlation between a BOC(1,1) waveform and a BOC(6,1) waveform is symmetrical as shown in FIG. 2, the autocorrelation function of a CBOC waveform is found:

$$I = VI_1 - WI_2 = (V^2 R_{BOC(1,1)}(\epsilon_\tau) + W^2 R_{BOC(6,1)}(\epsilon_\tau) - 2VW R_{BOC(1,1)/BOC(6,1)}(\epsilon_\tau))\cos(\epsilon_\phi) \text{ and}$$

$$Q = VQ_1 - WQ_2 = (V^2 R_{BOC(1,1)}(\epsilon_\tau) + W^2 R_{BOC(6,1)}(\epsilon_\tau) - 2VW R_{BOC(1,1)/BOC(6,1)}(\epsilon_\tau))\sin(\epsilon_\phi).$$

Figure 3:
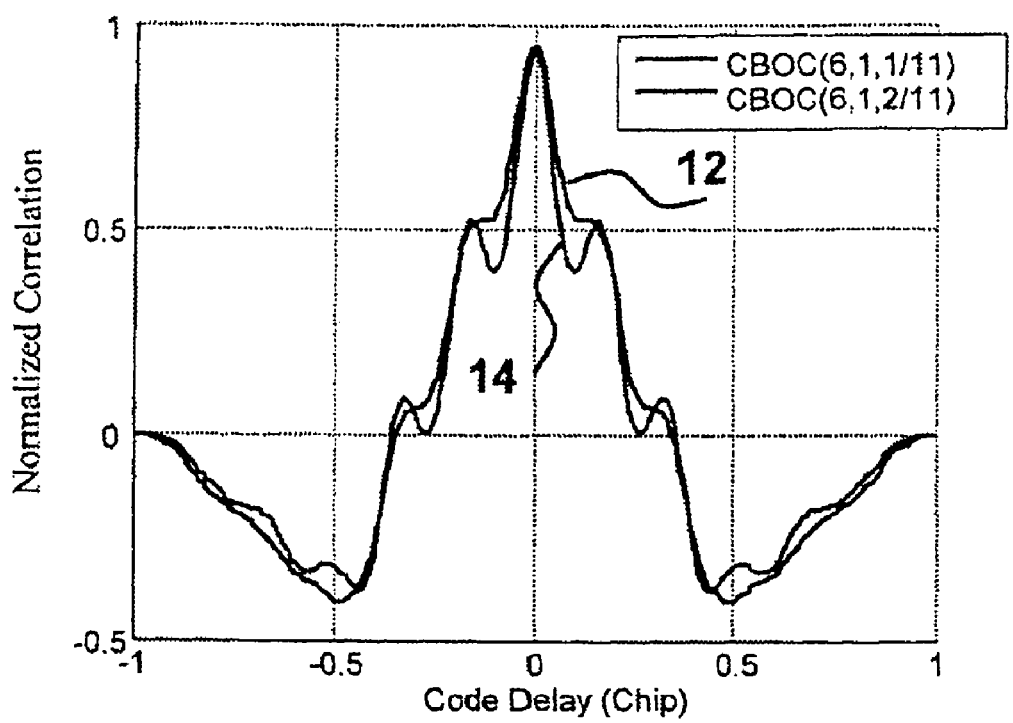
FIG. 3: is a representation of autocorrelations of two CBOC(6,1) waveforms having different weighting factors.

Autocorrelations 12, 14 of two CBOC waveforms are shown in FIG. 3. Assuming that the data and pilot channels each carry 50% of the power of the signal, the indices 1/11 and 2/11 indicate the multiplexing scheme used for the radionavigation signal and make reference to a certain weighting of the BOC(1,1) and BOC(6,1) components. For CBOC(6,1, 1/11), V=0.383998 and W=0.121431, while for CBOC(6,1, 2/11), V=0.358235 and W=0.168874. Reference numeral 12 indicates the autocorrelation function in the case of CBOC(6, 1,1/11) and reference numeral 14 indicates the autocorrelation function in the case of CBOC(6,1,2/11).

Figure 4:
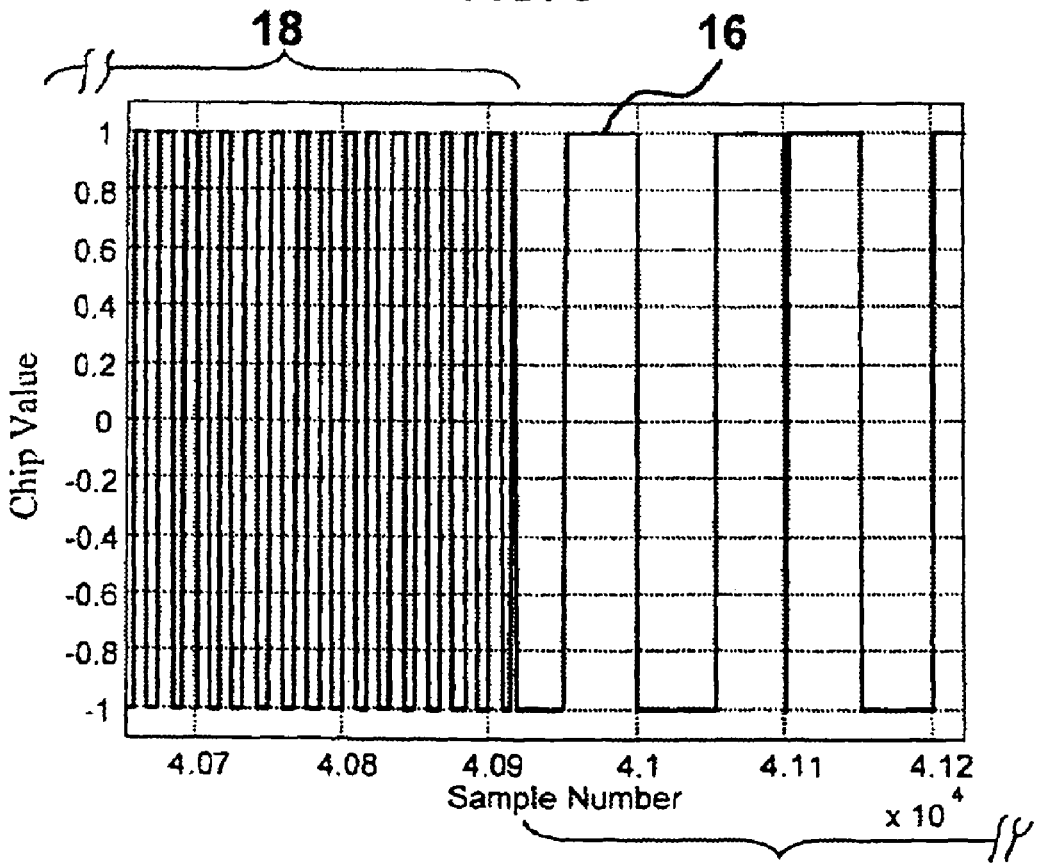
FIG. 4: is a temporal representation of a local binary waveform which may be used in a method according to the invention.

The drawback of the method described above is the number of correlators necessary for implementing it. The present invention proposes, for receiving the CBOC(6,1) waveform 10 defined above, performing the correlation of the incoming signal with a local time-multiplexed signal 16 which comprises a segment or some segments of pure BOC(1,1) and a segment or some segments of pure BOC(6,1). FIG. 4 shows a temporal representation of a local waveform $s_{LOC}(t)$, which has a BOC(6,1) waveform segment 18 at the start of the integration interval and a BOC(1,1) waveform segment 20 at the end of the integration interval. The local waveform 16 has only two values (binary waveform) and can therefore be encoded in one bit. The local waveform 16 carries the known part of the pseudo-random code modulating the CBOC(6,1) signal. Transitions of the value of the pseudo-random code can be identified at the x-coordinates 4.07 and 4.11 of FIG. 4. It will be noted that the local waveform 16 differs distinctly from the composite waveform modulating the incoming radionavigation signal 10.

Let T denote the duration of the integration interval, $\alpha T$ the total duration of the segment(s) 18 of pure BOC(6,1), with $0 < \alpha < 1$, and $\beta T$ the total duration of the segment(s) 20 of pure BOC(1,1), with $\beta = 1 - \alpha$. In order to analyse the result of a correlation between the radionavigation signal modulated by the CBOC(6,1) waveform 10 and the binary local waveform 16, the correlation may be decomposed:

$$\int_0^T s_{LOC}(t-\hat{\tau})CBOC(t-\tau)dt =$$
$$\int_0^{\alpha T} s_{LOC}(t-\hat{\tau})CBOC(t-\tau)dt + \int_{\alpha T}^T s_{LOC}(t-\hat{\tau})CBOC(t-\tau)dt$$

Taking another look at what has been seen in the previous example and assuming that the sequences of the pseudo-random code corresponding to the intervals $[0, \alpha T]$ and $[\alpha T, T]$ are themselves approximations to pseudo-random codes, the following approximation can be made:

$$I_{BOC(6,1)} = \alpha(VR_{BOC(1,1)/BOC(6,1)}(\epsilon_\tau) - WR_{BOC(6,1)}(\epsilon_\tau))\cos(\epsilon_\phi),$$

$$Q_{BOC(6,1)} = \alpha(VR_{BOC(1,1)/BOC(6,1)}(\epsilon_\tau) - WR_{BOC(6,1)}(\epsilon_\tau))\sin(\epsilon_\phi),$$

$$I_{BOC(1,1)} = \beta(VR_{BOC(1,1)}(\epsilon_\tau) - WR_{BOC(1,1)/BOC(6,1)}(\epsilon_\tau))\cos(\epsilon_\phi) \text{ and}$$

$$Q_{BOC(1,1)} = \beta(VR_{BOC(1,1)}(\epsilon_\tau) - WR_{BOC(1,1)/BOC(6,1)}(\epsilon_\tau))\sin(\epsilon_\phi).$$

The correlation thus becomes:

$$I = I_{BOC(1,1)} - I_{BOC(6,1)} = (\beta V R_{BOC(1,1)}(\varepsilon_\tau) - (\beta W + \alpha V) R_{BOC(1,1)/BOC(6,1)}(\varepsilon_\tau) + \alpha W R_{BOC(6,1)}(\varepsilon_\tau))\cos(\varepsilon_\phi)$$

$$Q = Q_{BOC(1,1)} - Q_{BOC(6,1)} = (\beta V R_{BOC(1,1)}(\varepsilon_\tau) - (\beta W + \alpha V) R_{BOC(1,1)/BOC(6,1)}(\varepsilon_\tau) + \alpha W R_{BOC(6,1)}(\varepsilon_\tau))\sin(\varepsilon_\phi)$$

It can be seen that, in order to yield, up to a multiplicative factor, the same relative contribution of the autocorrelation functions of the BOC(1,1) and BOC(6,1) waveforms in the CBOC autocorrelation function 12 or 14, it is necessary that $\alpha = W/(V+W)$ and $\beta = V/(V+W)$.

Figure 5:
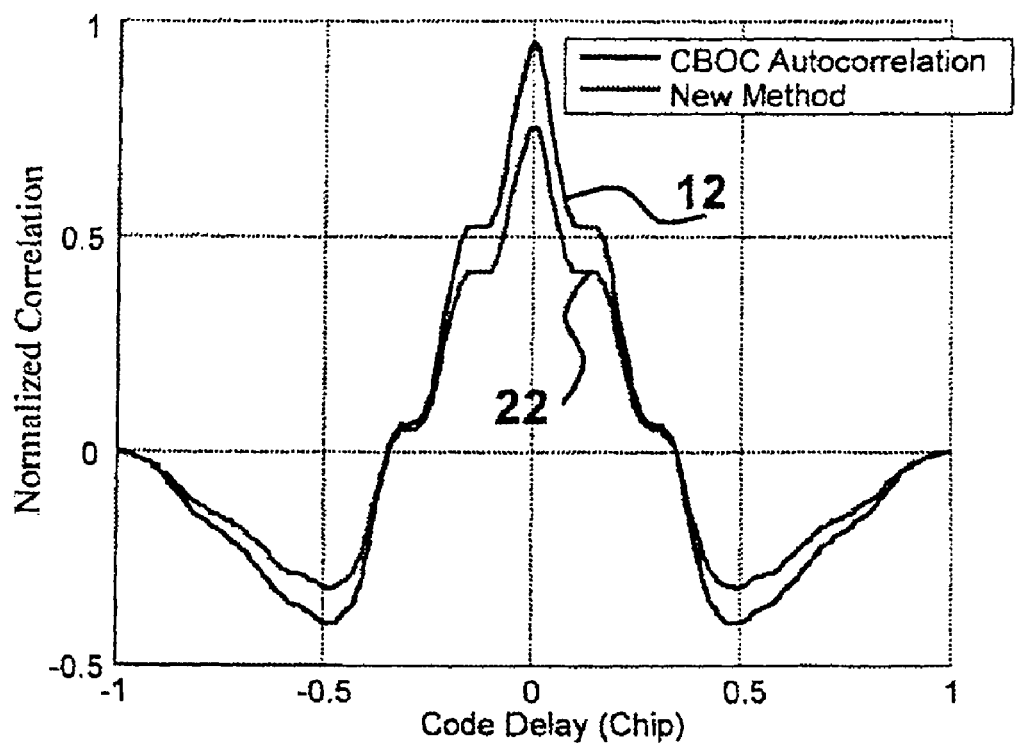
FIG. 5: shows a comparison between the autocorrelation function of a CBOC(6,1,1/11) and the correlation function between a CBOC(6,1,1/11) and a local binary waveform as shown in FIG. 4.

In the case of the CBOC(6,1,1/11) scheme, one thus preferably chooses $\alpha = 0.2403$ and $\beta = 0.7597$. FIG. 5 shows on the one hand the autocorrelation function 12 of CBOC(6,1,1/11), which has already been shown in FIG. 2, and on the other hand the correlation function 22 between CBOC(6,1,1/11) and the local binary waveform 16 with $\alpha = 0.2403$ and $\beta = 0.7597$. With regard to the appearance of the local binary waveform 16, this means that out of 4096 chips of the pseudo-random code, approximately 984 form the BOC(6,1) waveform segment(s) and 3112 form the BOC(1,1) waveform segment(s).

In the case of CBOC(6,1,2/11), $\alpha = W/(V+W)$ leads to $\alpha = 0.3204$ and $\beta = 0.6796$. In this case, out of 4096 chips of the pseudo-random code, approximately 1312 form the BOC(6, 1) waveform segment(s) and 2784 form the BOC(1,1) waveform segment(s).

Figure 6:
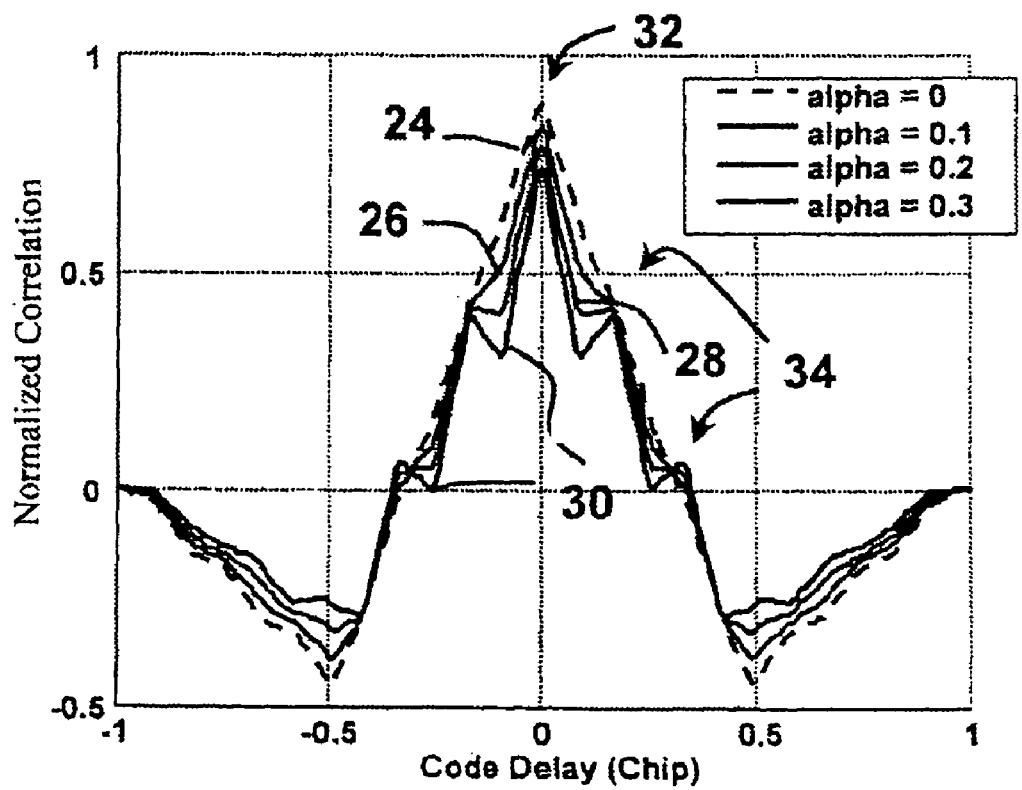
FIG. 6: shows different correlation functions between a CBOC(6,1,2/11) and a local binary waveform.

FIG. 6 shows a family of correlation functions 24, 26, 28 and 30 between a radionavigation signal modulated using the CBOC(6,1,2/11) scheme 10 and a local time-multiplexed binary waveform 16 obtained for different values of the parameter $\alpha$. It can be seen that the value of $\alpha$ makes it possible to act on the shape of the correlation function. With the selection $\alpha = 0$, one obtains the curve 24, with $\alpha = 0.1$ the curve 26, with $\alpha = 0.2$ the curve 28 and with $\alpha = 0.3$ the curve 30. Depending on the value of $\alpha$, the central peaks 32 and secondary peaks 34 are more or less pronounced.

Figure 7:
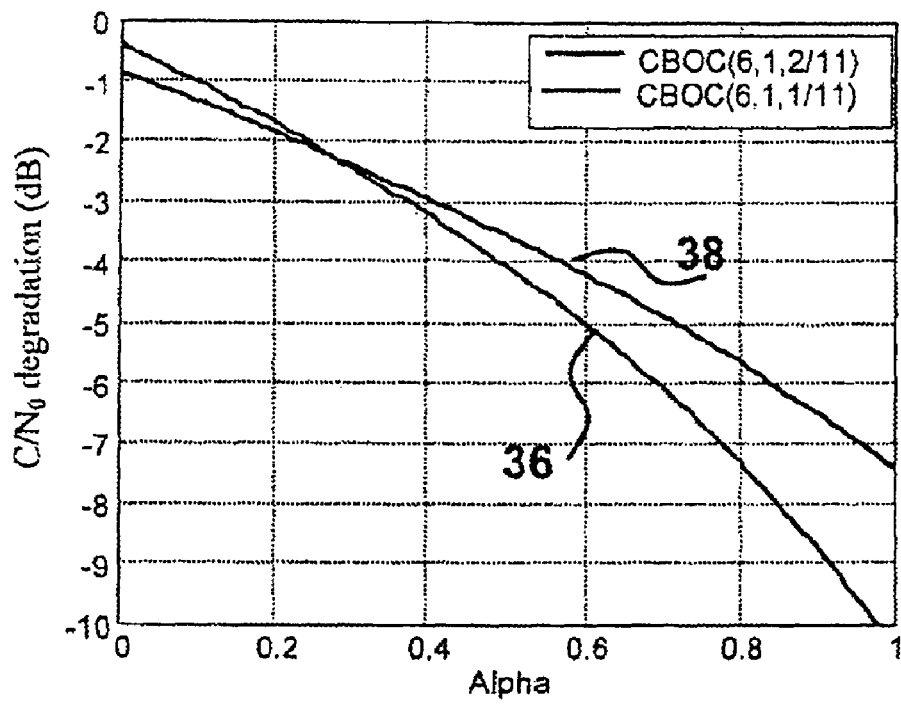
FIG. 7: is a representation of the degradation of the $C/N_0$ ratio as a function of the parameter $\alpha$, in the case of CBOC(6,1,1/11) and CBOC(6,1,2/11)

FIG. 7 shows the degradation of the $C/N_0$ ratio, i.e. the ratio of the received signal to the spectral noise density. Degradation of $C/N_0$ may be calculated by:

$$deg_{C/N_0} = \frac{\text{Peak\_Corr}^2}{\text{Peak\_Autocorr}^2} = \frac{(\beta V + \alpha W)^2}{(V^2 + W^2)^2},$$

because $R_{BOC(1,1)/BOC(6,1)}$ is symmetrical and has the value 0 at 0. Alternatively, this may be written:

$$deg_{C/N_0} = \frac{(V + \alpha(W-V))^2}{(V^2 + W^2)^2}.$$

FIG. 7 shows the degradation of $C/N_0$ for the cases CBOC (6,1,1/11) (curve 36) and CBOC(6,1,2/11) (curve 38). It can be seen that, for the cases where $\alpha = 0$, which corresponds to the case where the local waveform is a pure BOC(1,1), the degradation associated with the power part of the signal allocated to BOC(6,1) (1/11 and 2/11, respectively) does indeed occur. In the case of CBOC(6,1,1/11), with α=0.2403, degradation of the $C/N_0$ ratio of 1.97 dBs occurs. In the case of CBOC(6,1,2/11), with α=0.3204, degradation of the $C/N_0$ ratio of 2.56 dBs occurs.

Figure 8:
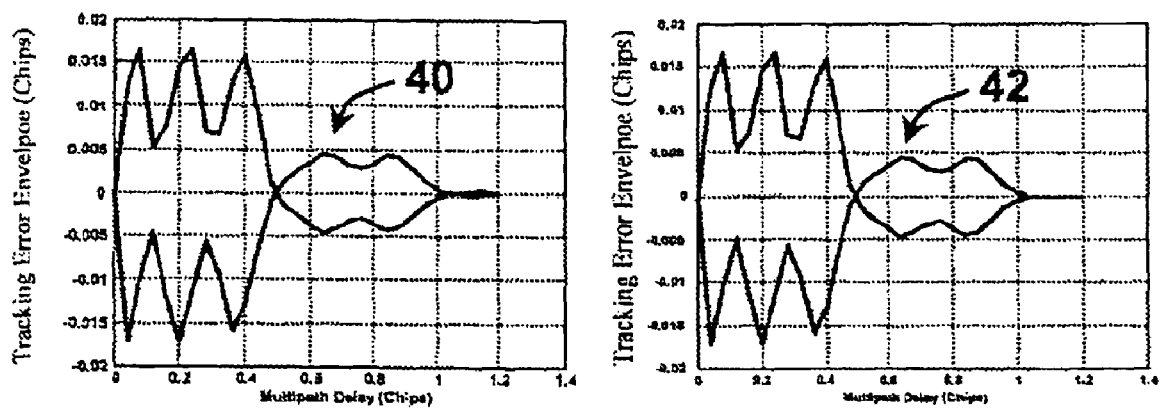
FIG. 8: shows a comparison of the multipath error envelope in the case where the local waveform is a composite CBOC(6,1) waveform and the multipath error envelope in the case where the local waveform is a binary waveform as shown in FIG. 4.

For the example of CBOC(6,1,1/11), FIG. 8 shows, on the left, the multipath error envelope 40 in the case where the local waveform is a corresponding composite CBOC(6,1) waveform and, on the right, the multipath error envelope 42 in the case where the local waveform is a time-multiplexed binary waveform with α=0.2403. It will be noted that the multipath error envelopes 40, 42 are essentially identical.

It remains to be noted that obtaining a correlation function which is similar to within one proportionality factor to the CBOC autocorrelation function is not the only criterion for optimising the value of α. This is because the local binary waveform may also in particular be selected on the basis of the criteria: (a) minimisation of the degradation of the $C/N_0$ ratio, (b) minimisation of the tracking error due to Gaussian white noise, (c) optimisation of the shape of the correlation function between the incoming signal and the local waveform and (d) reduction of multipath errors. A certain degree of freedom is thus available for the purpose of selecting the value of α.

Figure 9:
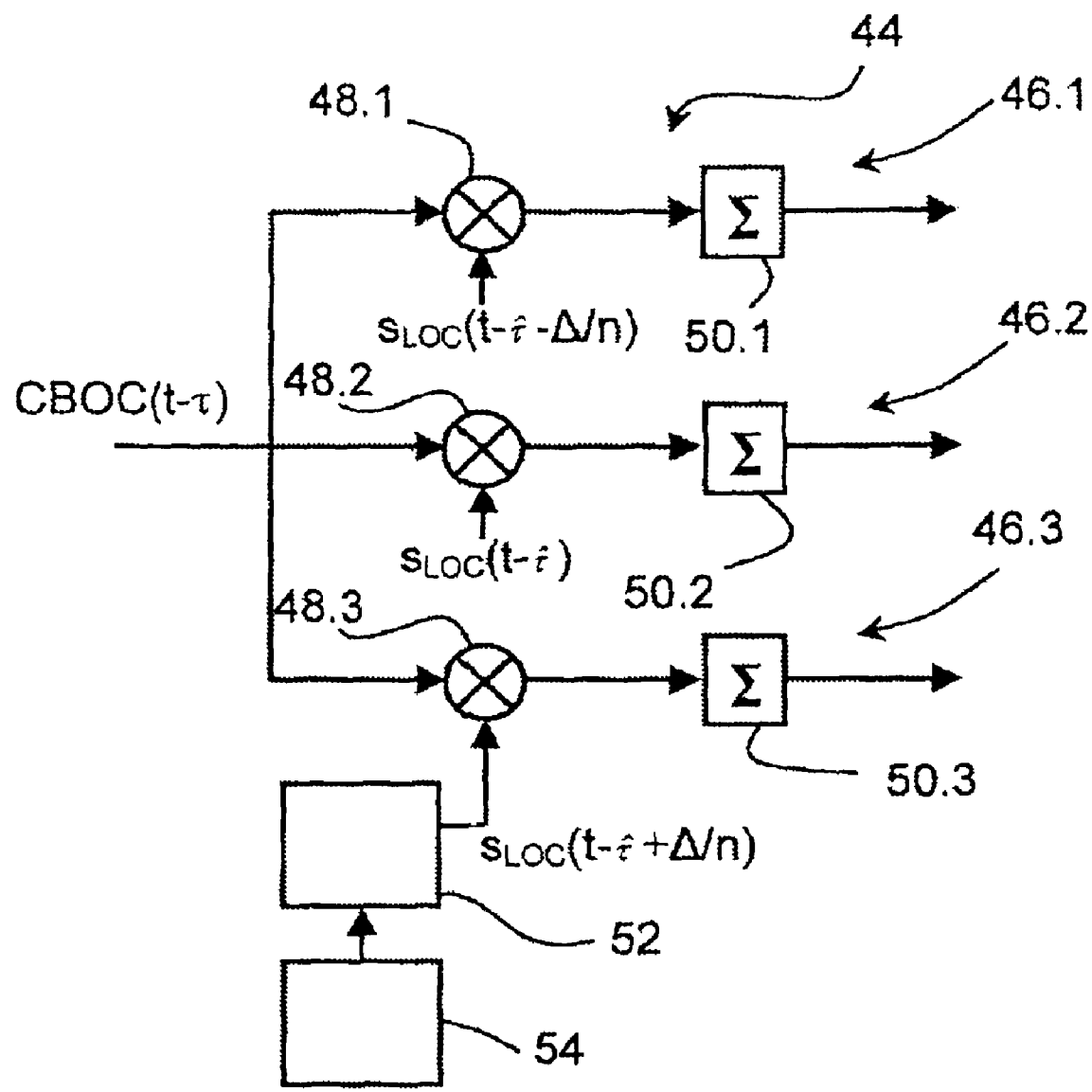
FIG. 9: is a diagram of a receiver capable of receiving a composite signal.

FIG. 9 shows the simplified diagram of the receive channel of a receiver 44 capable of receiving a composite signal, for example a CBOC signal. Baseband processed signals are assumed for this illustration, disregarding local carriers. The receiver 44 comprises a set 46 of correlators, three being shown by way of example. There may also be two or even one of these correlators 46.1, 46.2, 46.3 per channel, but there may also be more in order to reduce acquisition time and/or multipath error, for example. Each correlator comprises a mixer 48.1, 48.2, and 48.3 respectively, which mixes the incoming CBOC signal with a copy of the local binary waveform $s_{LOC}$, and an integrator 50.1, 50.2, and 50.3 respectively, which integrates the mixed signals and produces an output signal. It should be noted that, in order to receive several signals transmitted by satellites, a receiver needs a plurality of receive channels. For each receive channel of the receiver, there is such a set of correlators, the output signals of which are combined to form, in signal acquisition mode, an estimate of the energy of the received signal and, in signal tracking mode, the discriminator of the pseudo-random code.

The first, "early", correlator 46.1, provides the value of the correlation of the incoming CBOC(t−τ) signal and of an "early" copy of the local binary $s_{LOC}(t-\hat{\tau}-\Delta/n)$ waveform. It should be remembered that τ is the phase of the pseudo-random code of the received signal and $\hat{\tau}$ an estimate of τ. Δ is the duration of a chip and n determines the fraction of the chip duration by which the copy of the local binary waveform is early relative to estimate $\hat{\tau}$. The second, "in-phase", correlator 46.2 provides the value of the correlation of the incoming CBOC(t−τ) signal and of an "in-phase" copy of the local binary $s_{LOC}(t-\hat{\tau})$ waveform. The third, "late", correlator 46.3 supplies the value of the correlation of the incoming CBOC(t−τ) signal and of a "late" copy of the local binary $s_{LOC}(t-\hat{\tau}+\Delta/n)$ waveform.

In order to produce the $s_{LOC}(t-\hat{\tau}-\Delta/n)$, $s_{LOC}(t-\hat{\tau})$ and $s_{LOC}(t-\hat{\tau}+\Delta/n)$ signals, the receiver 44 comprises a set of generators. For reasons of clarity, only the generator 52 which provides the $s_{LOC}(t-\hat{\tau}+\Delta/n)$ copy of the local waveform is shown. The generator 52 is controlled by a control unit 54. The generator 52 may comprise, for example, a numerically controlled oscillator (NCO). In this case, the NCO receives as input a setpoint oscillation frequency corresponding to the Doppler-corrected chip rate together with a binary value which determines whether the NCO outputs a $BOC(n_2,m)$ or $BOC(n_1,m)$ waveform. The binary value is supplied by the control unit depending on the receiver operating mode, i.e. depending on whether the receiver is in acquisition mode, tracking mode, or whether it receives a CBOC signal or a TMBOC signal. The control unit in particular determines the temporal order of the $BOC(n_1,m)$ segment(s) and of the $BOC(n_2,m)$ segment(s) together with the duration of the $BOC(n_1,m)$ segment(s) and of the $BOC(n_2,m)$ segment(s).

The invention claimed is:

1. A method of receiving a radionavigation signal, the method comprising:
   receiving the radionavigation signal modulated by a composite waveform with a receiver, the composite waveform comprising a linear combination with real-valued coefficients of a $BOC(n_1,m)$ component and a $BOC(n_2,m)$ component, $n_1$ differing from $n_2$;
   performing a correlation between a local waveform and said composite waveform over a time interval of duration T with a correlation device,
   wherein the local waveform is a binary waveform, formed over said time interval by an alternating succession comprising at least one $BOC(n_1,m)$ waveform segment and at least one $BOC(n_2,m)$ waveform segment, the at least one $BOC(n_1,m)$ segment having a total duration of αT, α being strictly between 0 and 1, the at least one $BOC(n_2,m)$ segment having a total duration of (1−α)T.

2. A method according to claim 1, wherein the $BOC(n_1,m)$ and $BOC(n_2,m)$ components carry an identical pseudo-random code and wherein the local waveform carries at least one predetermined part of this pseudo-random code.

3. A method according to claim 1, wherein $n_2=1$ and m=1, the linear combination thus being a $CBOC(n_1, 1)$ waveform expressible by:

$$CBOC(n_1,1)(t)=V \cdot BOC(1,1)(t)+W \cdot BOC(n_1,1),$$

where V and W are real-valued weighting coefficients.

4. A method according to claim 1, wherein $n_1=6$.

5. A method according to claim 3, wherein α is at least approximately equal to W/(V+W).

6. A method according to to of claim 1, wherein said alternating succession comprises a plurality of $BOC(n_1,m)$ waveform segments of a total duration αT.

7. A receiver capable of receiving a radionavigation signal modulated by a composite waveform, the composite waveform comprising a linear combination with real-valued coefficients of a $BOC(n_1,m)$ component and a $BOC(n_2,m)$ component, $n_1$ differing from $n_2$,
   the receiver comprising a set of local waveform generators and correlators for performing a correlation between a local waveform and said composite waveform over a time interval of duration T,
   wherein the local waveform generators are configured to generate as said local waveform a local binary waveform, formed over said time interval of an alternating succession comprising at least one $BOC(n_1,m)$ waveform segment and at least one $BOC(n_2,m)$ waveform segment, the at least one $BOC(n_1,m)$ segment having a total duration of αT, α being strictly between 0 and 1, the at least one $BOC(n_2,m)$ segment having a total duration of (1−α)T.

8. A receiver according to claim 7, comprising a control unit acting on the local waveform generators so as to influence a temporal order of the at least one $BOC(n_1,m)$ segment and the at least one $BOC(n_2,m)$ segment.

9. A receiver according to claim 8, wherein $n_1=6$, $n_2=1$ and $m=1$.

10. A method according to claim 1, wherein said alternating succession comprises a plurality of $BOC(n_2,m)$ waveform segments of a total duration $(1-\alpha)T$.

11. A receiver according to claim 8, comprising a control unit acting on the local waveform generators so as to influence a duration of the at least one $BOC(n_1,m)$ segment and of the at least one $BOC(n_2,m)$ segment.

* * * * *